United States Patent
Kurabayashi et al.

(10) Patent No.: US 11,685,793 B2
(45) Date of Patent: Jun. 27, 2023

(54) METHOD FOR PRODUCING POROUS CELLULOSE PARTICLES, AND POROUS CELLULOSE PARTICLES

(71) Applicant: JNC CORPORATION, Tokyo (JP)

(72) Inventors: Toru Kurabayashi, Kumamoto (JP); Shigeyuki Aoyama, Tokyo (JP); Akihiro Uchida, Kumamoto (JP)

(73) Assignee: JNC CORPORATION, Tokyo (JP)

( * ) Notice: Subject to any disclaimer, the term of this patent is extended or adjusted under 35 U.S.C. 154(b) by 0 days.

(21) Appl. No.: 14/913,374

(22) PCT Filed: Aug. 13, 2014

(86) PCT No.: PCT/JP2014/071394
§ 371 (c)(1),
(2) Date: Feb. 22, 2016

(87) PCT Pub. No.: WO2015/029790
PCT Pub. Date: Mar. 5, 2015

(65) Prior Publication Data
US 2016/0200835 A1    Jul. 14, 2016

(30) Foreign Application Priority Data

Sep. 2, 2013   (JP) .............................. JP2013-181237

(51) Int. Cl.
| | | |
|---|---|---|
| C08B 3/06 | (2006.01) | |
| C08J 3/14 | (2006.01) | |
| B01J 39/22 | (2006.01) | |
| B01J 39/05 | (2017.01) | |
| B01J 39/26 | (2006.01) | |
| C08L 1/12 | (2006.01) | |
| B01J 20/285 | (2006.01) | |
| B01J 20/24 | (2006.01) | |
| B01J 20/30 | (2006.01) | |

(52) U.S. Cl.
CPC ............... *C08B 3/06* (2013.01); *B01J 20/24* (2013.01); *B01J 20/285* (2013.01); *B01J 20/3085* (2013.01); *B01J 39/05* (2017.01); *B01J 39/22* (2013.01); *B01J 39/26* (2013.01); *C08J 3/14* (2013.01); *C08L 1/12* (2013.01); *C08J 2301/12* (2013.01)

(58) Field of Classification Search
CPC ...... B01J 20/24; B01J 20/285; B01J 20/3085; B01J 39/043; B01J 39/05; B01J 39/22; B01J 39/26; C08B 3/06; C08J 3/14; C08L 1/12
USPC .......................................................... 536/71
See application file for complete search history.

(56) References Cited

U.S. PATENT DOCUMENTS

| | | | | |
|---|---|---|---|---|
| 1,959,446 | A | * 5/1934 | Scheidegger | ............. C08B 3/28 536/81 |
| 3,627,553 | A | * 12/1971 | Clark | .................... C09C 1/0015 106/415 |
| 4,068,670 | A | * 1/1978 | Yokota | ................... A24B 15/14 131/359 |
| 4,390,691 | A | 6/1983 | Nishikawa et al. | |
| 4,663,447 | A | * 5/1987 | Yamazaki | ................. C08J 3/14 264/13 |
| 4,724,210 | A | 2/1988 | Oka et al. | |
| 5,047,180 | A | 9/1991 | Steiner et al. | |
| 5,064,949 | A | 11/1991 | Steiner et al. | |
| 6,180,213 | B1 | * 1/2001 | Kuroki | ................. B41C 1/1041 428/195.1 |
| 2009/0062118 | A1 | 3/2009 | Umeda et al. | |
| 2010/0184957 | A1 | 7/2010 | Kawai et al. | |
| 2010/0330119 | A1 | 12/2010 | Yamamoto et al. | |
| 2013/0172538 | A1 | 7/2013 | Hirano et al. | |

FOREIGN PATENT DOCUMENTS

| | | |
|---|---|---|
| CN | 102911379 | 2/2013 |
| EP | 2266675 | 12/2010 |
| GB | 2152936 | 8/1985 |
| JP | S55-040618 | 3/1980 |
| JP | S55-044312 | 3/1980 |
| JP | S56-024430 | 3/1981 |
| JP | S60-155245 | 8/1985 |
| JP | S63-083144 | 4/1988 |
| JP | S63-095238 | 4/1988 |
| JP | H01-277570 | 11/1989 |
| JP | H06-136175 | 5/1994 |
| JP | H06-254373 | 9/1994 |
| JP | H10-195103 | 7/1998 |

(Continued)

OTHER PUBLICATIONS

Motozato et al.; JPH06136175 A; May 17, 1994 (Machine-English Translation).*
Brandner et al.; WO 0200771 A1; Jan. 3, 2002 (Machine-English Translation).*
Pintaric et al. (Journal of Molecular Liquids 85 (2000) 331-350).*
Takihara et al. (Cellulose (2007) 14:357-366).*
Sigma (GCY/NSB; Jan. 2003).*

(Continued)

*Primary Examiner* — Layla D Berry
(74) *Attorney, Agent, or Firm* — JCIPRNET (57) ABSTRACT

One embodiment shows a method for producing porous cellulose particles, including:
  (a) dissolving cellulose diacetate into a solvent to prepare a cellulose diacetate solution;
  (b) dispersing the cellulose diacetate solution into a medium immiscible with the cellulose diacetate solution to obtain a dispersed system;
  (c) cooling the dispersed system;
  (d) adding a poor solvent to the cooled dispersed system to precipitate cellulose diacetate particles; and
  (e) saponifying the cellulose diacetate particles.

8 Claims, 3 Drawing Sheets

(56) References Cited

FOREIGN PATENT DOCUMENTS

| JP | 2009-091542 | 4/2009 |
|---|---|---|
| JP | 2011-220992 | 11/2011 |
| JP | 2012-087202 | 5/2012 |
| SU | 1031966 | 7/1983 |
| WO | WO 0200771 A1 * | 1/2002 |
| WO | 2008/146906 | 12/2008 |
| WO | 2012/033223 | 3/2012 |
| WO | 2013016982 | 2/2013 |

OTHER PUBLICATIONS

Hofmann et al. (Industrial and Engineering Chemistry, vol. 21, No. 10, 955-965 (1929)).*

Wang et al. (Journal of Applied Polymer Science, vol. 54, 2157-2164 (1994)).*

"Search Report of Europe Counterpart Application", dated Mar. 24, 2017, p. 1-p. 10, in which the listed references were cited.

"First Office Action of China Counterpart Application" with English translation thereof, dated Apr. 27, 2017, p. 1-p. 16, in which the listed references were cited.

"International Search Report (Form PCT/ISA/210) of PCT/JP2014/071394", dated Oct. 7, 2014, with English translation thereof, pp. 1-4.

"Office Action of China Counterpart Application," with English translation thereof, dated Dec. 5, 2017, p. 1-p. 18.

"Office Action of European Counterpart Application," dated Apr. 26, 2018, p. 1-p. 8.

"Notice of Allowance of China Counterpart Application," dated Nov. 5, 2018, with English translation thereof, p. 1-p. 6.

"Office Action of Europe Counterpart Application", dated Dec. 21, 2018, p. 1-p. 4.

"Office Action of China Counterpart Application," with English translation thereof, dated Jul. 2, 2018, p. 1-p. 7.

"Notice of Allowance of Europe Counterpart Application," dated Apr. 3, 2019, p. 1-p. 52.

* cited by examiner

METHOD FOR PRODUCING POROUS CELLULOSE PARTICLES, AND POROUS CELLULOSE PARTICLES

CROSS-REFERENCE TO RELATED APPLICATION

This application is a 371 application of the international PCT application serial no. PCT/JP2014/071394, filed on Aug. 13, 2014, which claims the priority benefit of Japan application no. 2013-181237, filed on Sep. 2, 2013. The entirety of each of the above-mentioned patent applications is hereby incorporated by reference herein and made a part of this specification.

TECHNICAL FIELD

The invention relates to a method for producing porous cellulose particles, and porous cellulose particles that may be produced by the method.

BACKGROUND ART

Porous cellulose particles have resistance to an acidic solvent and a basic solvent, and can be modified to be added with various substituents. Therefore, the porous cellulose particles have been used in wide-ranged fields, such as isolation, purification and desalination of various substances as an adsorbent to a variety of substances. Specific examples of the fields in which the porous cellulose particles are used include a gel filtration technique (method for fractionating substances depending on a difference in molecule sizes). The gel filtration technique can be applied to any of an aqueous solution and an organic solvent, and can also be applied to a compound having any molecular weight. Therefore, the technique has been widely used not only in a laboratory scale but also in an industrial scale (Patent literature No. 1).

Moreover, the porous cellulose particles are excellent in adsorption characteristics, and comparatively high in mechanical strength. Thus, attention is also focused on an application to an adsorbent for antibody preparation purification (Patent literature No. 2) and a virus adsorbent for influenza or the like (Patent literature No. 3), both being industrially applicable.

As a raw material upon producing the porous cellulose particles, crystalline cellulose or cellulose triacetate is generally used. However, a solvent that can dissolve the raw materials is limited, and therefore upon preparing a cellulose solution in a production process, use of a highly harmful solvent is obliged in a current situation. Specific examples of the solvent for the crystalline cellulose include a calcium thiocyanate aqueous solution (Patent literature No. 4), and specific examples of the solvent for the cellulose triacetate include chlorinated hydrocarbon (Patent literature No. 5), but all of the solvents are highly harmful.

In view of such a situation, a report has been recently made on a method in which an ionic liquid or the like is used as a solvent for raw material cellulose (Patent literature No. 6). However, a newly proposed solvent is expensive and also difficult to handle.

Further, a report has been made on a production method in which cellulose diacetate is used as raw material cellulose (Patent literature Nos. 5, 7 and 8). However, in the method described in Patent literature No. 5, a highly harmful substance is used as the solvent for the cellulose acetate. The method described in Patent literature No. 7 requires special facilities or special conditions. The method described in Patent literature No. 8 in which filaments made from cellulose ester are melted at a very high temperature also requires special facilities. Thus, the conventional methods have a problem in view of cost and an environmental load, and therefore realization of the facilities is far from easy in a current situation.

CITATION LIST

Patent Literature

Patent literature No. 1: JP S56-24430 A
Patent literature No. 2: WO 08/146906 A
Patent literature No. 3: JP 2011-220992 A
Patent Literature No. 4: JP S55-44312 A
Patent literature No. 5: JP H6-254373 A
Patent literature No. 6: JP 2012-87202 A
Patent literature No. 7: JP H1-277570 A
Patent literature No. 8: JP S55-40618 A

SUMMARY OF INVENTION

Technical Problem

Under the background described above, an eager desire has been expressed for a method in which porous cellulose particles can be produced further simply without using a harmful solvent. Further, in order to obtain an adsorbent applicable to a variety of substances, the method in which a particle size and a pore size of the porous cellulose particles can be easily controlled is desirable.

Solution to Problem

The invention is as described below, for example.

Item 1. A method for producing porous cellulose particles, including:
(a) dissolving cellulose diacetate into a solvent to prepare a cellulose diacetate solution;
(b) dispersing the cellulose diacetate solution into a medium immiscible with the cellulose diacetate solution to obtain a dispersed system;
(c) cooling the dispersed system;
(d) adding a poor solvent to the cooled dispersed system to precipitate cellulose diacetate particles; and
(e) saponifying the cellulose diacetate particles.

Item 2. The method for producing porous cellulose particles according to item 1, wherein, in the (a), the solvent for the cellulose diacetate solution is selected from the group of an aqueous solvent such as an acetic acid aqueous solution, acetone, dimethylformamide and dimethylsulfoxide; an organic solvent such as cyclohexanone, ethyl acetate and butyl acetate; and a mixture thereof.

Item 2-1. The method for producing porous cellulose particles according to item 2, wherein, in the (a), the solvent for the cellulose diacetate solution is an acetic acid aqueous solution or cyclohexanone.

Item 3. The method for producing porous cellulose particles according to item 2-1, wherein, in the (a), the solvent for the cellulose diacetate solution is an acetic acid aqueous solution and a content of acetic acid in the acetic acid aqueous solution is 80 to 95% by weight based on the acetic acid aqueous solution.

Item 4. The method for producing porous cellulose particles according to any one of items 1 to 3, wherein, in the (d), the poor solvent is water, alcohols, glycols or a mixed liquid thereof.

Item 5. The method for producing porous cellulose particles according to any one of items 1 to 4, wherein, in the (b), the medium immiscible with the cellulose diacetate solution is water or an organic medium.

Item 6. The method for producing porous cellulose particles according to item 5, wherein, in the (b), the medium immiscible with the cellulose diacetate solution is an organic medium, and the organic medium is toluene or o-dichlorobenzene.

Item 6-1. The method for producing porous cellulose particles according to item 5, wherein, in the (a), the solvent for the cellulose diacetate solution is an aqueous solvent such as an acetic acid aqueous solution, acetone, dimethylformamide and dimethylsulfoxide, and in the (b), the medium immiscible with the cellulose diacetate solution is an organic medium such as toluene, o-dichlorobenzene and xylene.

Item 6-2. The method for producing porous cellulose particles according to item 5, wherein, in the (a), the solvent for the cellulose diacetate solution is an organic solvent such as cyclohexanone, ethyl acetate and butyl acetate, and in the (b), the medium immiscible with the cellulose diacetate solution is an aqueous medium such as water.

Item 7. The method for producing porous cellulose particles according to any one of items 1 to 6-2, wherein, in the (a), the cellulose diacetate has an acetylation degree of 45 to 57%.

Item 8. The method for producing porous cellulose particles according to any one of items 1 to 7, wherein, in the (a), a content of cellulose diacetate in the cellulose diacetate solution is 3 to 20% by weight based on the cellulose diacetate solution.

Item 9. The method for producing porous cellulose particles according to any one of items 1 to 8, wherein, in the (a), the cellulose diacetate is dissolved into the solvent at a temperature of 25° C. to 100° C.

Item 10. The method for producing porous cellulose particles according to item 9, wherein, in the (a), the cellulose diacetate is dissolved into the solvent at a temperature of 40° C. to 100° C.

Item 10-1. The method for producing porous cellulose particles according to any one of items 1 to 10, wherein, in the (b), a temperature of the dispersion medium is 40 to 100° C.

Item 11. The method for producing porous cellulose particles according to any one of items 1 to 10-1, wherein, in the (c), the cooling is performed by cooling the system to a temperature of 0° C. to 40° C.

Item 12. Porous cellulose particles, which may be produced by the method for producing porous cellulose particles according to any one of items 1 to 11.

Item 13. The porous cellulose particles according to item 12, wherein a content of cellulose diacetate in the cellulose diacetate solution in the (a) is 6 to 12% by weight based on the cellulose diacetate solution, the cooling in the (c) is performed by cooling the system to a temperature of 0° C. to 30° C., a Kav value measured using PEG having a molecular weight of 8,000 is 0.01 or more and 0.52 or less, and a Kav value measured using PEG having a molecular weight of 12,000 is 0.001 or more and 0.45 or less.

Item 14. A media for chromatography, containing the porous cellulose particles according to item 12 or 13 or the porous cellulose particles modified.

Item 14-1. The media for chromatography according to item 14, wherein the modification is performed with a sulfate group-containing group or a sulfonate group-containing group.

Item 15. The media for chromatography according to item 14 or 14-1, used for isolating or purifying virus particles.

Item 16. The media for chromatography according to item 15, used for isolating or purifying influenza virus particles or hepatitis B virus particles, wherein the media contains porous cellulose particles modified with a sulfate group-containing group or a sulfonate group-containing group, and an S content is 800 to 5,000 μg/g based on the porous cellulose particles modified.

Item 16-1. A method for producing the media for chromatography according to item 16, including:

(a) dissolving cellulose diacetate into a solvent to prepare a cellulose diacetate solution;

(b) dispersing the cellulose diacetate solution into a medium immiscible with the cellulose diacetate solution to obtain a dispersed system;

(c) cooling the dispersed system;

(d) adding a poor solvent to the cooled dispersed system to precipitate cellulose diacetate particles;

(e) saponifying the cellulose diacetate particles to obtain porous cellulose particles; and (f) modifying the porous cellulose particles with a sulfate group-containing group or a sulfonate group-containing group.

Advantageous Effects of Invention

According to the invention, porous cellulose particles can be obtained by a simpler method without using a harmful solvent. Moreover, according to the method of the invention, a particle size and a pore size of the porous cellulose particles can be easily controlled.

DESCRIPTION OF EMBODIMENTS

An embodiment of the invention will be described in detail below.

First, a method for producing porous cellulose particles as related to one aspect of the invention will be described. The method for producing porous cellulose of the invention includes steps (a) to (e) below in the order:

(a) dissolving cellulose diacetate into a solvent to prepare a cellulose diacetate solution;

(b) dispersing the cellulose diacetate solution into a medium immiscible with the cellulose diacetate solution to obtain a dispersed system;

(c) cooling the dispersed system;

(d) adding a poor solvent to the cooled dispersed system to precipitate cellulose acetate particles; and (e) saponifying the cellulose acetate particles.

Each step described above will be described in the order below.

Step (a)

In the (a), cellulose diacetate as a raw material is dissolved into a solvent to prepare a cellulose diacetate solution. The cellulose acetate is a semisynthetic polymer obtained by performing acetic acid esterification of cellulose being a natural polymer. The cellulose acetate widely used in an industrial scale is generally divided into 2 kinds including cellulose diacetate and cellulose triacetate, and a general acetylation degree thereof is about 50 to 57% and about 60 to 62%, respectively. In the method of the invention, the cellulose diacetate is used as the raw material. The cellulose diacetate used in the invention is not particularly limited, as long as the material is generally defined as the cellulose diacetate, but the acetylation degree is preferably 45 to 57%, and further preferably 53 to 56%. The cellulose diacetate can be dissolved into more kinds of solvents by using the cellulose diacetate having the acetylation degree of 45 to 57%.

Specifically, the cellulose diacetate can be used in which the cellulose diacetate is obtained by acetylating linter pulp, wood pulp or the like with acetic acid and/or acetic anhydride, and further partially saponifying the resulting material. In the above case, an esterification degree can be appropriately adjusted such that the acetylation degree falls within the range described above. For example, refer to JP S62-000501 A.

The solvent into which the cellulose diacetate is dissolved is not particularly limited, as long as the solvent can dissolve the cellulose diacetate, but a less harmful solvent is preferred. The cellulose diacetate has a wide range of usable solvents, which is different from the cellulose triacetate, and the less harmful solvent can be selected and used therefrom. The solvents may be used alone in one kind, or two or more kinds thereof may be mixed and used. Specific examples include an aqueous solvent such as an acetic acid aqueous solution, acetone, dimethylformamide and dimethylsulfoxide; an organic solvent such as cyclohexanone, ethyl acetate and butyl acetate; and a mixture thereof. Above all, an acetic acid aqueous solution or cyclohexanone is particularly preferred for reasons of ease of availability and ease of handling.

When the acetic acid aqueous solution is used as the solvent for the cellulose diacetate, a content of acetic acid is preferably 80 to 95% by weight based on the acetic acid aqueous solution. A concentration of the acetic acid aqueous solution is preferably adjusted within the range described in view of solubility, and temperature control during work, and so forth. More specifically, the cellulose diacetate can be successfully dissolved thereinto by adjusting the concentration of the acetic acid aqueous solution within the range described above.

As described above, according to the invention, the less harmful solvent can be used, and therefore the porous cellulose particles can be further safely produced. Moreover, use of the less harmful solvent is reasonably preferred also from a viewpoint of environmental protection.

An amount of the cellulose diacetate in the cellulose diacetate solution is determined according to a desired particle size, pore size and strength of the porous cellulose particles being a final product. The desired particle size, pore size and strength are different depending on an application of the porous cellulose particles. For example, the amount of the cellulose diacetate is preferably 3 to 20% by weight, further preferably 4 to 15% by weight, and particularly preferably 4 to 12% by weight, based on 100% by weight of the cellulose diacetate solution. Particles having mechanical strength and porosity can be obtained by adjusting the content of cellulose diacetate within the range described above. Moreover, spherical particles can be easily obtained.

As the amount of the cellulose diacetate in the cellulose diacetate solution is larger, viscosity of the solution increases, but a solid content and the strength of cellulose particles to be obtained increase. However, if the content of cellulose diacetate is too high, a problem may occur such that the viscosity becomes too high, and operability is deteriorated, or not spherical but flake-shaped cellulose particles precipitate. On the other hand, if the content of cellulose diacetate is too low, no cellulose precipitates in the form of particles, or the mechanical strength of the cellulose particles is minimized in several cases.

In the (a), the cellulose diacetate is dissolved into the solvent at a temperature of preferably 25 to 100° C., further preferably 40 to 100° C., and particularly preferably 40 to 90° C. The cellulose diacetate can be rapidly dissolved into the solvent by adjusting the temperature to 25° C. or higher. On the other hand, if the temperature exceeds 100° C., the temperature approaches a boiling point of the solvent, and therefore such a temperature is unfavorable depending on the solvent to be used in several cases. Moreover, adjustment of an operation temperature to 25 to 100° C. also has an advantage of facilitating control of the particle size and the pore size of the porous cellulose particles.

Step (b)

In the (b), the cellulose diacetate solution obtained in the (a) is added to the medium (hereinafter, also referred to as a dispersion medium) immiscible with the cellulose diacetate solution, and the resulting mixture is stirred. Thus, the dispersed system is obtained in which droplets of the cellulose diacetate solution are dispersed into the dispersion medium.

Any medium can be used as the dispersion medium, as long as the medium can disperse the cellulose diacetate solution thereinto without being miscible with the cellulose diacetate solution obtained in the (a). A usable dispersion medium is influenced depending on the solvent to be used in the (a) for the cellulose diacetate. More specifically, when the aqueous solvent (for example, the acetic acid aqueous solution) is used as the solvent for the cellulose diacetate, an organic medium immiscible therewith is used as the dispersion medium. Specific examples of the organic medium herein include toluene, o-dichlorobenzene and xylene, and preferably toluene or o-dichlorobenzene. The toluene and the o-dichlorobenzene are easily available and the spherical particles can be easily obtained by using the mediums as the dispersion medium. Two or more kinds of the organic mediums can also be mixed and used.

On the other hand, when the organic solvent (for example, cyclohexanone) is used for the cellulose diacetate, an aqueous medium being the medium immiscible with the solvent is used as the dispersion medium. Specific example of the aqueous medium include water, and an aqueous solution containing polyvinyl alcohol or the like can also be used for the purpose of adjusting the viscosity of the dispersion medium. The aqueous mediums are easily available, and preferred also in view of an environmental load. Two or more kinds of the aqueous mediums can also be mixed and used.

A temperature of the dispersion medium is preferably 40 to 100° C., and further preferably 60 to 95° C. The temperature is preferably adjusted within the temperature range described above from a viewpoint of dispersibility of the cellulose diacetate solution into the dispersion medium. Moreover, a form of the cellulose diacetate solution can be held in a spherical shape by adjusting the temperature within the temperature range described above, and therefore such a case is preferred. On the other hand, if the operation temperature exceeds 100° C., the temperature has approached the boiling point of the solvent, and therefore such a temperature is unfavorable depending on the dispersion medium to be used in several cases.

In the (b), a surfactant may be arbitrarily added thereto. The droplets of the cellulose diacetate solution can be maintained in a further spherical shape, and the particle size can be controlled by adding the surfactant. The surfactant can be used without any particular restriction, as long as the material is the surfactant, but is preferably a nonionic surfactant and a silicone-based surfactant. Specific examples include sorbitan monooleate, polyethylene glycol, polyvinyl alcohol, alkyl glycoside and a polyoxyethylene-methylpolysiloxane copolymer.

A size of the droplets of the cellulose diacetate solution can also be controlled depending on a kind and/or an amount of the surfactant to be used. For example, when a decrease in the size of the droplets of the cellulose diacetate solution is desired, sorbitan monooleate is preferably added thereto, and when an increase in the size of the droplets is desired, a polyoxyethylene-methylpolysiloxane copolymer is preferably added thereto. Moreover, an amount of addition of the surfactant is preferably 0.03 to 3.0% by weight, further preferably 0.05 to 1.0% by weight, and particularly preferably 0.06 to 0.6% by weight, based on the medium. Here, when the increase in the size of the droplets of the cellulose diacetate solution is desired, the amount of addition of the surfactant only needs to be decreased, and when the decrease in the size of the droplets is desired, the amount of addition of the surfactant only needs to be increased.

Step (c)

In the (c), the dispersed system obtained in the (b) is cooled. The pore size and the particle size of the cellulose particles to be obtained can be controlled by cooling.

A cooling temperature is not particularly limited, as long as the temperature is applied at which the cellulose diacetate precipitates by adding the poor solvent thereto in the (d) described below. However, from a viewpoint of facilitating control of the particle size and the pore size of the porous cellulose particles being the final product, the cooling temperature is preferably 40° C. or lower. Moreover, the cooling temperature is further preferably 0 to 40° C., and particularly preferably 0 to 30° C. When the system is cooled to a temperature lower than 0° C., the dispersed system as a whole has a possibility of being frozen.

Step (d)

In the (d), the poor solvent is added to the cooled dispersed system in the (c). Thus, the cellulose diacetate particles can be precipitated.

The poor solvent used herein is not particularly limited, as long as the material is a solvent having low solubility in the cellulose diacetate and can cause precipitation of the cellulose diacetate particles by being added thereto. Specifically, for example, water, alcohols, glycols and a mixture thereof can be used. As the alcohols, lower alcohols are preferred, and alcohols having 1 to 3 carbons are further preferred. Specific examples include methanol, ethanol, 1-propanol and 2-propanol. Specific examples of the glycols include ethylene glycol, propylene glycol, diethylene glycol and trimethylene glycol.

When a mixed solvent is used as the poor solvent, the mixed solvent is preferably a mixed liquid of water and alcohols or a mixed liquid of water and glycols. The mixed solvent is further preferably a mixed liquid of water and alcohols, and particularly preferably a mixed liquid of water and methanol, a mixed liquid of water and ethanol or a mixed liquid of water and 2-propanol.

Precipitated cellulose diacetate particles are separated by any one of methods known to a person skilled in the art, and provided for in a next step (e). The separation can be performed by filtration, for example.

Step (e)

In the (e), the cellulose diacetate particles precipitated in the (d) is saponified. Thus, an ester moiety in the cellulose diacetate is hydrolyzed, and the cellulose particles can be obtained. The cellulose particles obtained herein have porosity.

Saponification can be performed by a method known to a person skilled in the art, and by using alkali and alcohol, for example. As the alkali, for example, an aqueous solution of sodium hydroxide or potassium hydroxide is preferably used. Moreover, as the alcohol, lower alcohol is preferred. For example, methanol or ethanol is preferred. Specifically, saponification can be performed by stirring the cellulose diacetate particles obtained in the (d) in a mixed liquid of alkali and alcohol for a predetermined period of time, for example.

Prior to the saponification, the cellulose diacetate particles obtained in the (d) are preferably washed. A solution to be used for washing is not particularly limited, as long as the material is a solution that can wash the cellulose diacetate particles without destroying a structure thereof. For example, methanol or water can be used.

In the method of the invention, the cellulose diacetate is used as the raw material, and therefore the less harmful solvent can be selected as the solvent upon preparing the cellulose solution. Accordingly, the porous cellulose particles can be produced by the method that is safer and preferred also in the viewpoint of the environmental protection. Moreover, neither the special facilities nor the special conditions are required to use, and therefore the porous cellulose particles can be produced further easily and at lower cost. Further, according to the method related to the embodiment of the invention, the particle size and the pore size of the porous cellulose particles to be obtained can be easily controlled, and therefore the cellulose particles having the particle size and the pore size optimum for each application can be obtained. According to the method related to the embodiment of the invention, the porous cellulose particles having the particle size and the pore size in a wide size range can be obtained. More specifically, even the porous cellulose particles having the particle size and the pore size in any of a small size, a medium size and a large size can be obtained.

The particle size and the pore size of the porous cellulose particles can be easily controlled by changing a variety of conditions in the method of the invention. For example, the particle size and the pore size can be controlled depending on the operation temperature in each step, the amount of the cellulose diacetate raw material to be used, the kind of the solvent and the poor solvent to be used, or the kind and the amount of addition of the surfactant to be used.

Specifically, as the concentration of the cellulose diacetate in the cellulose solution is higher in the (a), the particle size of the porous cellulose particles to be obtained tends to be larger and the pore size tends to be smaller.

Moreover, when the aqueous solvent such as the acetic acid aqueous solution is used as the solvent for dissolving the cellulose diacetate thereinto, the particle size of the porous cellulose particles to be obtained tends to be larger. On the other hand, when the organic solvent is used as the solvent for dissolving the cellulose diacetate thereinto, the particle size and the pore size of the porous cellulose particles to be obtained tend to be smaller.

Moreover, as the viscosity in the dispersed system obtained in the (b) is higher, the particle size of the porous cellulose particles to be obtained tends to be smaller. However, the viscosity in the dispersed system does not significantly influence the pore size of the porous cellulose particles.

Moreover, if the amount of addition of the surfactant to be used is increased, the particle size of the porous cellulose particles to be obtained tends to be smaller, and conversely, if the amount of addition of the surfactant to be used is decreased, the particle size of the porous cellulose particles to be obtained tends to be larger. Moreover, a particle size distribution of the porous cellulose particles to be obtained can be changed by changing the kind of the surfactant to be used. However, the pore size of the porous cellulose particles is not significantly influenced even by changing the amount and the kind of the surfactant.

Further, as the cooling temperature in the (c) is lower, the particle size of the porous cellulose particles to be obtained tends to be smaller and the pore size tends to be larger. Conversely, when the cooling temperature is relatively higher, the particle size of the porous cellulose particles to be obtained tends to be larger and the pore size tends to be smaller.

Moreover, as the solubility of the poor solvent to be added in the (d) in the cellulose diacetate is lower, the pore size of the porous cellulose particles to be obtained tends to be larger. However, the kind of the poor solvent does not significantly influence the particle size of the porous cellulose particles. Thus, the pore size tends to be smaller by rapidly crystallizing the cellulose diacetate, and the pore size tends to be larger by slowly crystallizing the cellulose diacetate.

Porous Cellulose Particles or Porous Cellulose Particles Modified

According to one embodiment of the invention, the porous cellulose particles that may be produced by the production method described above is provided. The porous cellulose particles can be used in isolation or purification of various substances. For example, the porous cellulose particles can be used, in a gel filtration technique such as size exclusion chromatography, for fractionating substances having different molecule sizes. On the above occasion, the porous cellulose particles to be obtained according to the invention may be directly applied thereto, or may be applied thereto in the form of being modified with a substituent or being subjected to a crosslinking reaction.

Moreover, an adsorbent capable of adsorbing a variety of substances can be easily obtained by adding a ligand to at least part of a reactive functional group in the porous cellulose particles of the invention. For example, the adsorbent may be used in a virus adsorbent for an influenza virus or hepatitis B, an adsorbent for antibody preparation purification or an LDL cholesterol adsorbent. According to the method related to the embodiment of the invention, as described above, the particle size and the pore size of the porous cellulose particles can be easily controlled in the wide range, and therefore the adsorbent that is excellent in adsorption characteristics and less in nonspecific adsorption can be suitably produced according to the application.

Specifically, a media for chromatography preferred for isolation or purification of protein such as lysozyme, immunoglobulin and a blood coagulation factor can be provided by applying sulfation treatment to at least part of hydroxy groups in the porous cellulose particles of the invention to introduce a sulfate group ($-OSO_3H$) into the porous cellulose particles.

A method of introducing the sulfate group into the porous cellulose particles of the invention, namely, a method of obtaining sulfated porous cellulose particles is not particularly limited, but can be applied as described below, for example.

First, a sulfating agent is arranged in a reaction vessel. The sulfating agent used in the invention is not particularly limited, as long as the sulfating agent reacts with the hydroxy group in the cellulose particles and can introduce the sulfate group into the porous cellulose particles. Specific examples of such a sulfating agent include a chlorosulfonic acid-pyridine complex, piperidine-N-sulfuric acid, a sulfur trioxide-dimethylformamide complex, a sulfur trioxide-pyridine complex, a sulfur trioxide-trimethylamine complex and a sulfuric acid-trimethylamine composite. An amount of use of the sulfating agent only needs to be arbitrarily selected depending on an objective introduction ratio of the sulfate group and reaction conditions, and 0.001 to 1 equivalent is suitably used based on the hydroxy group in the porous cellulose particles.

Next, dried porous cellulose particles are added to the sulfating agent to perform a sulfation reaction. Although a reaction temperature and a reaction time are different depending on the kind of the solvent or the sulfating agent, the reaction is performed in an inert gas atmosphere at ordinarily 0 to 100° C., and preferably 20 to 85° C., and for preferably 0.5 to 24 hours, and further preferably 0.5 to 10 hours.

After completion of the reaction, the resulting reaction mixture may be neutralized by adding an alkaline aqueous solution, for example, an aqueous solution of sodium hydroxide.

Then, the reaction mixture obtained is filtrated or centrifuged to collect a product, and the product is washed with water to neutrality, and objective sulfated porous cellulose particles can be obtained. An amount of introduction of the sulfate group into the sulfated porous cellulose particles can be adjusted by changing the amount of addition of the sulfating agent or the like, and only needs to be appropriately determined according to the application of the chromatography media, or the like.

Moreover, a media for strong cation exchange chromatography preferred for isolation or purification of the protein such as the immunoglobulin and the lysozyme can also be provided by applying sulfonation treatment to at least part of the hydroxy groups in the porous cellulose particles of the invention to introduce a sulfonate group-containing group into the particles.

The sulfonate group-containing group capable of being introduced into the porous cellulose particles of the invention is not particularly limited, as long as the group is a hydrocarbon group containing the sulfonate group ($-SO_3H$), and a hydrogen atom contained in the sulfonate group-containing group may be further replaced by a substituent such as a hydroxy group, a halogen atom and an epoxy group. Above all, the sulfonate group-containing group to be introduced thereinto is preferably a sulfoalkyl group having 1 to 5 carbons that may have a substituent.

A method of introducing the sulfonate group-containing group into the porous cellulose particles of the invention is not limited, as long as the method is generally applied to the sulfonation treatment of polysaccharide. Specific examples include a method of treating the porous cellulose particles of the invention by using a sulfonating agent such as haloalkane sulfonate such as sodium 3-chloro-2-hydroxypropane-sulfonate and sodium 3-bromopropane sulfonate, or sulfonic acid having epoxide such as 1,4-butanesultone, 1,3-propane-sultone or 1,2-epoxyethanesulfonic acid.

An amount of introduction of the sulfonate group-containing group into the sulfonated porous cellulose particles can be adjusted by changing an amount of addition of the sulfonating agent, alkali or the like, and only needs to be appropriately determined according to the application of the chromatography media or the like.

The sulfonation treatment of the porous cellulose particles can be applied with reference to JP 2001-302702 A or JP H9-235301 A. An objective sulfonate group-containing group can be introduced thereinto by an objective amount by appropriately changing a design of experimental conditions.

As described above, according to one embodiment of the invention, the media for chromatography or the adsorbent each containing the porous cellulose particles or the porous cellulose particles modified to be obtained according to the invention can be provided. The media for chromatography or the adsorbent according to the invention can be used, particularly for isolating or purifying the protein such as the lysozyme, the immunoglobulin and the blood coagulation factor, and the influenza virus and the hepatitis B or the like virus particles.

From a viewpoint of capability of using the particles as the adsorbent for a variety of substances, a mean particle size of the porous cellulose particles is preferably 1 μm to 2 mm, further preferably 20 μm to 1 mm, and particularly preferably 35 μm to 600 μm. However, the mean particle size is not limited thereto. In addition, the mean particle size is calculated by measuring a median size using a size distribution measurement instrument: Laser Scattering Particle Size distribution Analyzer Partica LA-950 made by HORIBA, Ltd.

EXAMPLES

The invention is described in detail by way of Examples below, but the content of the invention is not limited by the Examples. Moreover, in the Examples below, unless otherwise described, "%" is expressed in terms of "% by weight."

Example 1

To 352.5 g of 85% acetic acid aqueous solution, 48.1 g of cellulose diacetate (reagent made by Wako Pure Chemical Industries, Ltd., acetylation degree: 53 to 56%) was added, and the resulting mixture was stirred. Further, the cellulose diacetate was dissolved thereinto by increasing temperature and stirring the resulting mixture at 60° C. for 1 hour to obtain a transparent solution in which a concentration of the cellulose diacetate was 12%. The solution was quickly poured into 1.5 L of o-dichlorobenzene at 100° C., containing 1.97 g of surfactant: sorbitan monoolate, and the resulting mixture was stirred for 10 minutes at the revolution number of 400 rpm to obtain a dispersed system. Subsequently, when the dispersed system was cooled to 30° C., 620 mL of pure water being a poor solvent was added dropwise thereto. As a result, the cellulose diacetate precipitated to obtain spherical cellulose diacetate particles. Then, the cellulose diacetate particles obtained were thoroughly washed with a large amount of methanol and subsequently water. Then, the cellulose diacetate particles after being washed were classified by using a sieve having an opening of 600 μm.

The cellulose diacetate particles that passed through the sieve were saponified by being stirred in a mixed liquid of 360 mL of 55% methanol aqueous solution and 177 g of 20% sodium hydroxide aqueous solution at 35° C. for 20 hours. As a result, the porous cellulose particles being a final product were obtained.

Test Example 1

Measurement of Particle Size Distribution

A particle size distribution of the porous cellulose particles obtained in Example 1 was measured to determine a mean particle size. An instrument used for the measurement was as described below.

Instrument: Laser Scattering Particle Size distribution Analyzer Partica LA-950 (made by HORIBA, Ltd.).

A median size was measured by using the instrument described above to calculate the mean particle size.

Test Example 2

Measurement of Gel Partition Coefficient Kav

A Kav value was measured for the porous cellulose particles obtained in Example 1. A measurement method is as described below.

(1) Equipment and Reagent Used
Column: Empty column ¼×4.0 mm I.D×300 mm, 10F (Tosoh Corporation)
Reservoir: Packer·⅜ (Tosoh Corporation)
Pump: POMP P-500 (Pharmacia Corporation)
Pressure gauge: AP-53A (KEYENCE Corporation)
(2) Column Packing Method The column and the reservoir were connected and an end fitting was connected to a lower part of the column. Then, 15 g of cellulose particles for which Kav was to be measured was metered in a state in which a wet gel was filtrated under reduced pressure, and put in a 50 mL beaker Thereto, 20 mL of ultrapure water was added, and the resulting mixture was lightly stirred. The resulting material was slowly added so as to run down along a wall of the reservoir in a state in which the cellulose particles were dispersed into ultrapure water. The cellulose particles remaining in the beaker were rinsed with a small amount of ultrapure water, and slowly added to the column. Then, ultrapure water was added up to an upper very limit of the reservoir, and a lid of the reservoir was placed thereon. An adaptor was connected to an upper part of the reservoir and ultrapure water was delivered thereto by using a pump. A pressure gauge is connected to a liquid delivery line on the way, and pressure was monitored. A flow rate was increased until the pressure reached 0.3 MPa, and then the cellulose particles were packed for 30 minutes while ultrapure water was flowed. When packing finished, the pump was stopped, and the adaptor and the lid of the reservoir were removed. Next, ultrapure water in the reservoir was sucked out by using a pipette. The reservoir was removed, the cellulose particles out of the column were removed and an end fitting was connected thereto.

(3) Kav Measurement Equipment (Trade Name)
System: SCL-10APVP (SHIMADZU Corporation)
Workstation: CLASS-VP (SHIMADZU Corporation)
RI detector: RID-10A (SHIMADZU Corporation)
Pump: LC-10AT (SHIMADZU Corporation)
Auto injector: SIL-10ADVP (SHIMADZU Corporation)

(4) Kav Measurement Sample (Trade Name)

A Kav measurement sample shown in Table A below was used.

TABLE A

| | |
|---|---|
| 1 | Dextran T2000 (Pharmacia) |
| 2 | SE-70 (Tosoh) Molecular Weight $5.8 \times 10^5$ |
| 3 | SE-30 (Tosoh) Molecular Weight $3.0 \times 10^5$ |
| 4 | SE-15 (Tosoh) Molecular Weigh $1.5 \times 10^5$ |
| 5 | SE-8 (Tosoh) Molecular Weight $1.01 \times 10^5$ |
| 6 | SE-5 (Tosoh) Molecular Weight $4.3 \times 10^4$ |
| 7 | SE-2 (Tosoh) Molecular Weight $2.77 \times 10^4$ |
| 8 | PEG19000 (SCIENTIFIC POLYMER PRODUCTS) Molecular Weight 19,700 |
| 9 | PEG8650 (POLYMER LABORATORIES) Molecular Weight 8,650 |
| 10 | PEG4120 (POLYMER LABORATORIES) Molecular Weight 4,120 |

A solution that was adjusted to have a concentration of 50 mg/mL by dissolving the Kav measurement sample described above into pure water was used for measurement.

(5) Kav Measurement

The column packed with the cellulose particles was set to the Kav measurement equipment. Ultrapure water was passed therethrough at a flow rate of 0.4 mL/min for 60 minutes. Then, 10 µL of the Kav measurement sample was applied to the column, and ultrapure water was passed therethrough for 45 minutes. Detection of the Kav measurement sample was performed by using the RI detector, and recorded on a measurement chart. Operations described above were performed for each Kav measurement sample. The measurement chart (vertical axis: RI detection intensity, horizontal axis: time) obtained showed a normal distribution. A time to be maximal in the RI detection intensity was recorded.

(6) Kav Derivation Formula

A retention volume (mL) of the Kav measurement sample was calculated from the time to be maximal in the RI detection intensity obtained in the Kav measurement, and an amount of liquid passed therethrough at the time.

Kav was calculated by the formula described below.

$$Kav=(Ve-V_0)/(Vt-V_0)$$

(In the formula, Ve, Vt and $V_0$ stand for retention volume (mL) of a sample, an empty column volume (mL) and a dextran T 2000 retention volume (mL), respectively).

A molecular weight at which the Kav value becomes zero upon plotting the Kav value on the vertical axis and the molecular weight on the horizontal axis is an exclusion limit molecular weight.

Examples 2 and 3

Porous cellulose particles were produced in a manner similar to Example 1 except that a cellulose diacetate concentration in a cellulose diacetate solution was adjusted to 10% (Example 2), and 4% (Example 3), respectively. A size distribution and a Kav value of the porous cellulose particles obtained were measured in a manner similar to Example 1.

The results in Examples 1 to 3 are shown in Table 1 below. The Kav value shown in Table 1 is expressed in terms of a value in the case of PEG 4120 (POLYMER LABORATORIES, Ltd.).

TABLE 1

| | Cellulose diacetate concentration (wt %) | Mean particle size (µm) | Kav (Molecular weight 4120) |
|---|---|---|---|
| Example 1 | 12 | 434 | 0.29 |
| Example 2 | 10 | 350 | 0.28 |
| Example 3 | 4 | 255 | 0.32 |

Figure 1:
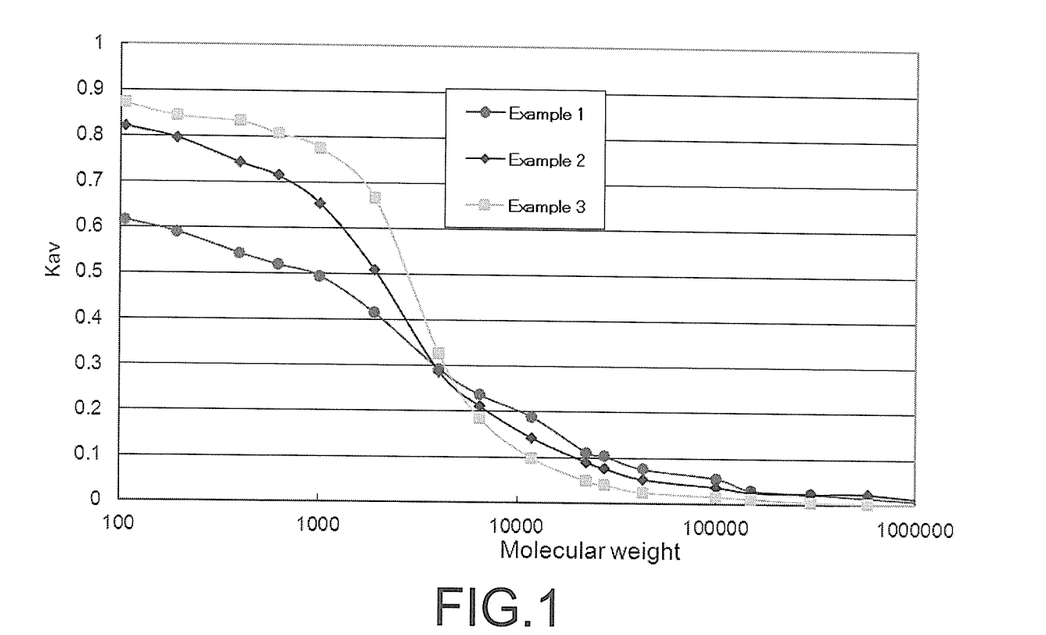
FIG. 1 is a diagram showing Kav values of porous cellulose particles obtained in Examples 1 to 3.

Table 1 reasonably shows that, as the cellulose diacetate concentration is higher, the mean particle size of the porous cellulose particles obtained tends to be larger. FIG. 1 shows the Kav values of the porous cellulose particles obtained in Examples 1 to 3. FIG. 1 reasonably shows that, as the cellulose diacetate concentration is higher, the Kav value of the porous cellulose particles obtained tends to be smaller, more specifically, the pore size of the porous cellulose particles obtained tends to be smaller. Moreover, the exclusion limit molecular weight of the cellulose particles obtained in Examples 1 to 3 was 100,000 Da or less.

Example 4

Porous cellulose particles were produced in a manner similar to Example 1 except that a cellulose diacetate concentration in a cellulose diacetate solution was adjusted to 10%, and that 620 mL of 50% methanol aqueous solution was used as a poor solvent. A particle size distribution and a Kav value of the porous cellulose particles obtained were measured in a manner similar to Example 1.

Example 5

Porous cellulose particles were produced in a manner similar to Example 4 except that a cellulose diacetate concentration in a cellulose diacetate solution was adjusted to 6%. A particle size distribution and a Kav value of the porous cellulose particles obtained were measured in a manner similar to Example 1.

The results in Examples 4 and 5 are shown in Table 2 below.

TABLE 2

| | Cellulose diacetate concentration (wt %) | Mean particle size (µm) | Kav (Molecular weight 4120) |
|---|---|---|---|
| Example 4 | 10 | 284 | 0.32 |
| Example 5 | 6 | 297 | 0.61 |

Example 6

To 352.5 g of 85% acetic acid aqueous solution, 39.2 g of cellulose diacetate (reagent made by Wako Pure Chemical Industries, Ltd., acetylation degree: 53 to 56%) was added, and the resulting mixture was stirred. Further, the cellulose diacetate was dissolved thereinto by increasing temperature and stirring the resulting mixture at 60° C. for 1 hour to obtain a transparent solution in which a concentration of the cellulose diacetate was 10%. The solution was quickly poured into 1.5 L of o-dichlorobenzene at 100° C., containing 1.97 g of surfactant: sorbitan monoolate, and the resulting mixture was stirred for 10 minutes at the revolution number of 400 rpm to obtain a dispersed system. Subsequently, the dispersed system was cooled to 0° C., and stirred at 0° C. for 1 hour as was, and then 620 mL of pure water at 5° C. or lower, being a poor solvent, was added dropwise thereto. As a result, the cellulose diacetate precipitated to obtain spherical cellulose diacetate particles. Subsequent steps of washing and saponification were performed in a manner similar to Example 1.

A particle size distribution and a Kav value of the porous cellulose particles obtained were measured in a manner similar to Example 1.

Examples 7 to 9

Porous cellulose particles were produced in a manner similar to Example 6 except that a cellulose diacetate concentration in a cellulose diacetate solution was adjusted to 8% (Example 7), 6% (Example 8) and 4% (Example 9). A particle size distribution and a Kav value of the porous cellulose particles obtained were measured in a manner similar to Example 1.

The results in Examples 6 to 9 are shown in Table 3 below.

TABLE 3

|  | Cellulose diacetate concentration (wt %) | Mean particle size (μm) | Kav (Molecular weight 4120) |
|---|---|---|---|
| Example 6 | 10 | 210 | 0.28 |
| Example 7 | 8 | 160 | 0.52 |
| Example 8 | 6 | 134 | 0.62 |
| Example 9 | 4 | 138 | 0.79 |

Figure 2:
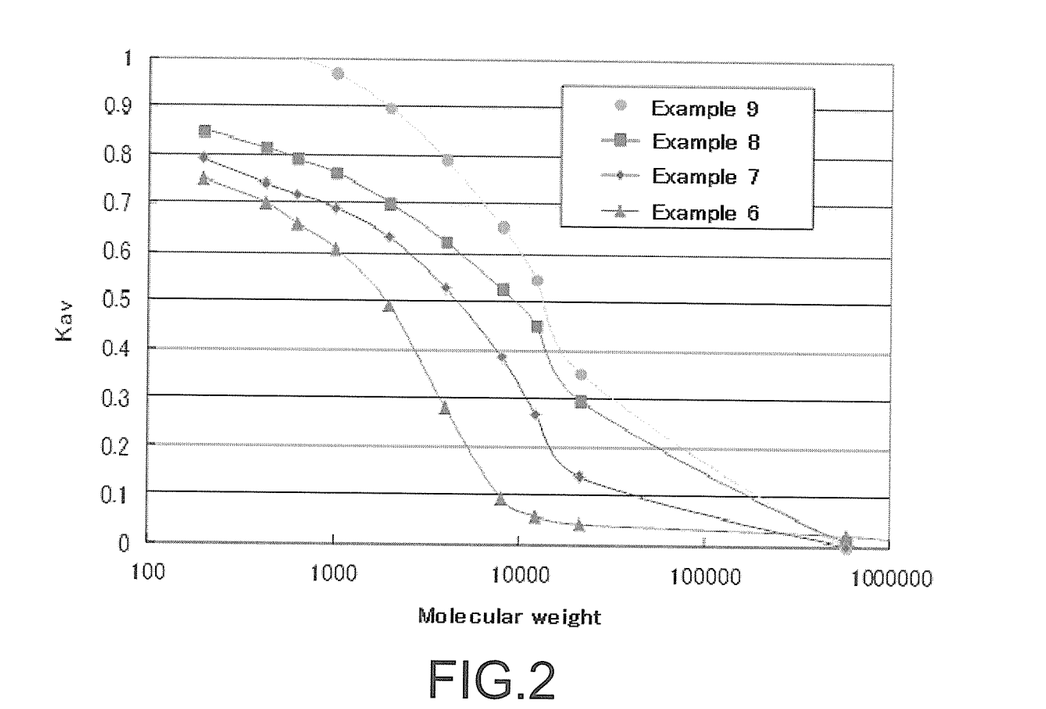
FIG. 2 is a diagram showing Kav values of porous cellulose particles obtained in Examples 6 to 9.

Table 3 reasonably shows that, as the cellulose diacetate concentration is larger, the mean particle size of the porous cellulose particles obtained tends to be larger. Moreover, FIG. 2 shows the Kav values of the porous cellulose particles obtained in Examples 6 to 9. FIG. 2 reasonably shows that, as the cellulose diacetate concentration is larger, the Kav value of the porous cellulose particles obtained tends to be smaller, more specifically, the pore size of the porous cellulose particles obtained tends to be smaller.

Figure 3:
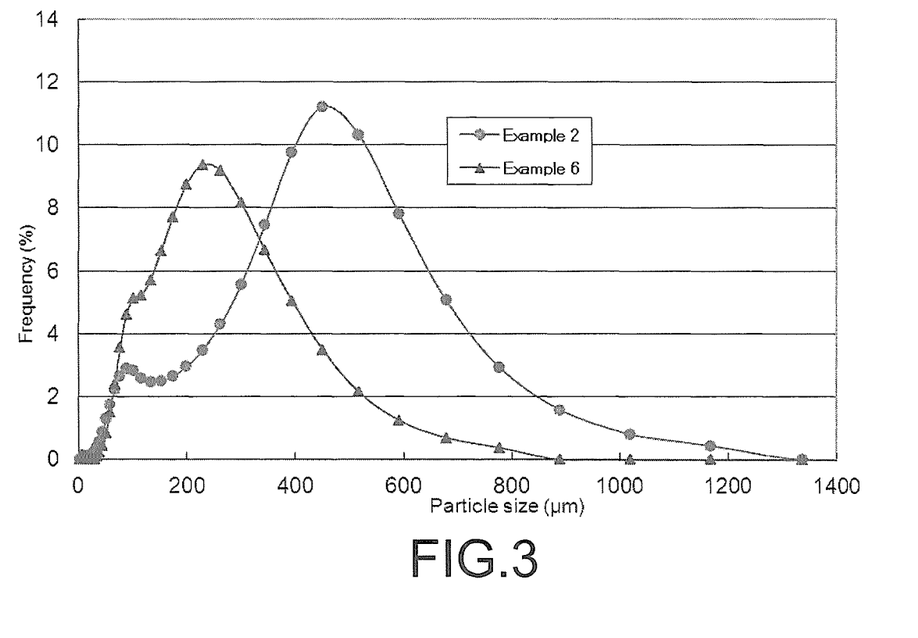
FIG. 3 is a diagram showing a relationship between a cooling temperature and a particle size of porous cellulose particles.

FIG. 3 is a diagram showing a relationship between a cooling temperature and a particle size of the porous cellulose particles. In the cases of Example 2 (cooling temperature: 30° C.) and Example 6 (cooling temperature: 0° C.), comparison is made on the particle size distributions of the porous cellulose particles. FIG. 3 reasonably shows that a lower cooling temperature tends to give a smaller particle size of the porous cellulose particles.

Figure 4:
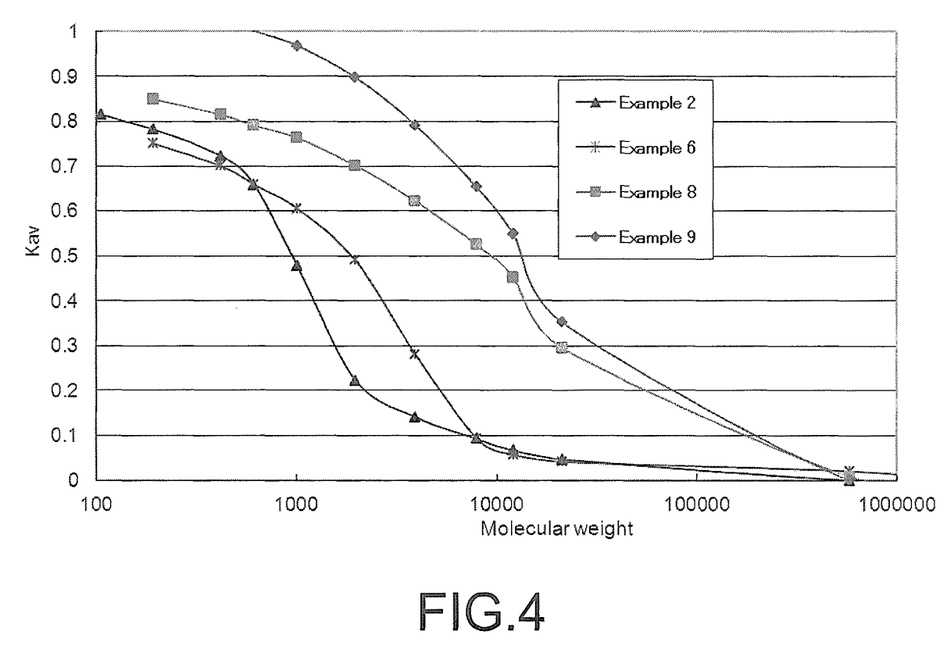
FIG. 4 is a diagram showing Kav values of porous cellulose particles obtained in Examples 2, 6, 8 and 9.

FIG. 4 is a diagram showing the Kav values of the porous cellulose particles obtained in Examples 2, 6, 8 and 9. Comparison between the results in Example 2 (cooling temperature: 30° C.) and Example 6 (cooling temperature: 0° C.) reasonably shows that a lower cooling temperature tends to give a larger Kav value, more specifically, a larger pore size of the porous cellulose particles obtained.

Example 10

To 352.5 g of cyclohexanone, 39.2 g of cellulose diacetate (reagent made by Wako Pure Chemical Industries, Ltd., acetylation degree: 53 to 56%) was added, and the resulting mixture was stirred. Further, the cellulose diacetate was dissolved thereinto by increasing temperature and stirring the resulting mixture at 90° C. for 1 hour to obtain a transparent solution in which a concentration of the cellulose diacetate was 10%. The solution was quickly poured into 1.5 L of water at 90° C., containing 1.97 g of surfactant: sodium dodecylbenzenesulfonate, and the resulting mixture was stirred for 10 minutes at the revolution number of 400 rpm to obtain a dispersed system. Subsequently, when the dispersed system was cooled to 30° C., 620 mL of methanol being a poor solvent was added dropwise thereto. As a result, the cellulose diacetate precipitated to obtain spherical cellulose diacetate particles. Then, subsequent steps of washing and saponification were performed in a manner similar to Example 1.

A particle size distribution and a Kav value of the porous cellulose particles obtained were measured in a manner similar to Example 1.

Example 11

A cellulose diacetate dispersed system was prepared in a manner similar to Example 10. Then, the dispersed system was cooled to 0° C., and stirred at 0° C. for 1 hour as was, and then 620 mL of cold methanol being a poor solvent was added dropwise thereto. As a result, the cellulose diacetate precipitated to obtain spherical cellulose diacetate particles. Subsequent steps of washing and saponification were performed in a manner similar to Example 1.

A particle size distribution and a Kav value of the porous cellulose particles obtained were measured in a manner similar to Example 1.

The results in Examples 10 and 11 are shown in Table 4 below.

TABLE 4

|  | Mean particle size (μm) | Kav (Molecular weight 4120) |
|---|---|---|
| Example 10 | 275 | 0.018 |
| Example 11 | 134 | 0.012 |

Comparison between Tables 1 to 3 and Table 4 reasonably shows that the mean particle size of the cellulose particles obtained in Examples 1 to 9 in which the aqueous solvent (acetic acid aqueous solution) was used as the solvent to the cellulose diacetate tends to be larger than the mean particle size of the cellulose particles obtained in Examples 10 and 11 in which the organic solvent (cyclohexanone) was used as the solvent to the cellulose diacetate. Moreover, when the organic solvent was used (Examples 10 and 11), the Kav value tends to be smaller, more specifically, the pore size of the porous cellulose particles obtained tends to be smaller.

Comparative Example 1

Commercially available Cellufine Sulfate (made by JNC Corporation, S content: 950 μg/g) produced by using cellulose triacetate as a raw material was used in Comparative Example. A particle size distribution and a Kav value of the product were measured in a manner similar to Example 1.

Comparative Example 2

To a 60% calcium thiocyanate aqueous solution, crystalline cellulose (Ceolus PH-101: made by Asahi Kasei Corporation) was added, and the resulting mixture was stirred at 110° C. to prepare a solution having a 6% cellulose concentration. The solution was poured into 1.5 L of o-dichlorobenzene at 130° C., containing a surfactant: sorbitan monooleate while the resulting mixture was stirred to obtain a dispersed system. Then, the dispersed system was cooled to 40° C., and methanol as a poor solvent was added dropwise thereto. As a result, the cellulose diacetate precipitated to obtain spherical cellulose diacetate particles.

Then, the spherical cellulose diacetate particles were washed with a large amount of methanol and water.

A size distribution and a Kav value of the porous cellulose particles obtained were measured in a manner similar to Example 1.

The results in Comparative Examples 1 and 2 are shown in Table 5 below.

TABLE 5

|  | Raw material | Mean particle size (μm) | Kav (Molecular weight 4120) |
|---|---|---|---|
| Comparative Example 1 | Cellulose triacetate | 80 | 0.002 |
| Comparative Example 2 | Crystalline cellulose | 130 | 0.55 |

Figure 5:
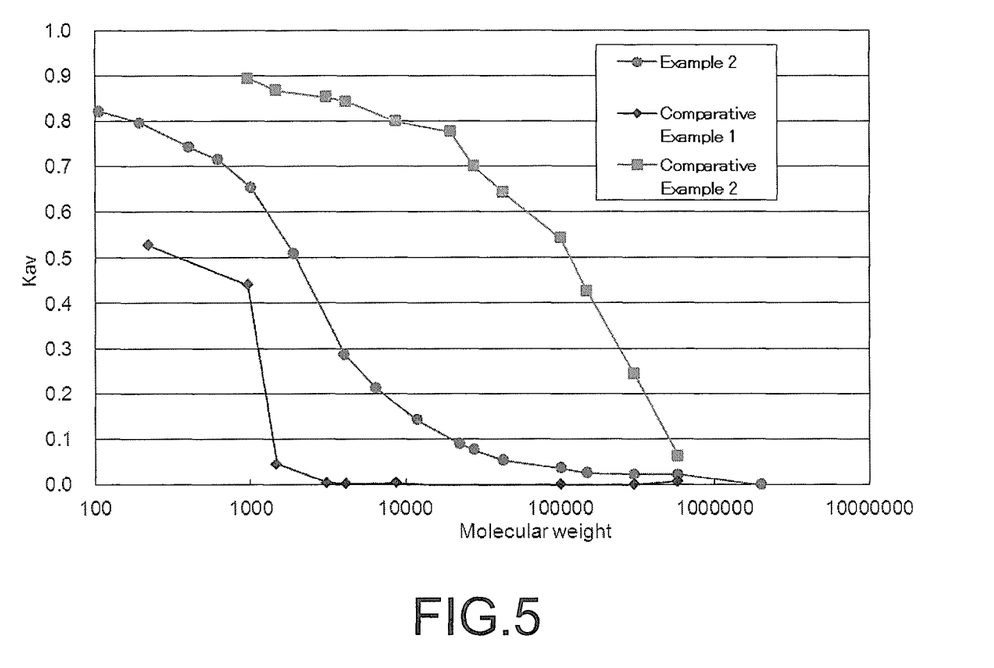
FIG. 5 is a diagram showing Kav values of porous cellulose particles obtained in Example 2 and Comparative Examples 1 and 2.

FIG. 5 is a diagram showing the Kav values of the porous cellulose particles obtained in Example 2 and Comparative Examples 1 and 2. FIG. 5 shows that the porous cellulose particles having a middle Kav value (namely, middle pore size) are obtained according to one aspect of the invention.

Example 12

Use as Media for Chromatography

An example relating to a media for chromatography being one preferred use form of the porous cellulose particles of the invention is described below.

Each elution time (time from injection to a maximum value of an elution peak) of Samples 1 to 3 below was measured by using the porous cellulose particles produced in Example 6. The measurement was carried out in a manner similar to the measurement of the gel partition coefficient Kav described above except that a mixture: 0.05 M phosphoric acid pH 8.0+0.5 M NaCl was used as a solvent of a mobile phase and the sample.

Sample 1. Human γ-globulin, derived from serum (made by Wako Pure chemical Industries, Ltd.); molecular weight: $16.0 \times 10^4$.

Sample 2. Bovine serum albumin, derived from bovine serum (made by Wako Pure Chemical Industries, Ltd.); molecular weight: $6.6 \times 10^4$.

Sample 3. Lysozyme, derived from egg white (made by Wako Pure Chemical Industries, Ltd.); molecular weight: $1.43 \times 10^4$.

The elution time of each sample was 16.9 minutes for Sample 1, 17.1 minute for Sample 2, and 20.6 minutes for Sample 3. From the results, isolation of protein having different molecular weights was found to be allowed due to a difference in the elution time by using the porous cellulose particles related to the embodiment of the invention. Accordingly, the porous cellulose particles of the invention can be reasonably used as a column media for size exclusion chromatography, for example.

Example 13

Use as Adsorbent

An example relating to an adsorbent being one preferred use form of the porous cellulose particles of the invention is described below.

The porous cellulose particles obtained in Example 2, Example 6 and Comparative Example 2 were passed through a sieve having an opening of 125 μm and a sieve having an opening of 53 μm to fractionate cellulose particles having a particle size of 125 to 53 μm. The cellulose particles obtained were allowed to react with 1 mol equivalent of chlorosulfonic acid at 65° C. to obtain sulfated cellulose particles (hereinafter, taken as Example 2A, Example 6A and Comparative Example 2A). When an S content in each of the sulfated cellulose particles (namely, a sulfur content based on 1 g of sulfated cellulose particles) was determined by an ion chromatography method (details will be described in Test Example 3 below), the content was 14,000 μg/g for Example 2A and 18,000 μg/g for Example 6A. With regard to Comparative Example 2A, when an attempt was made to perform sulfation of the porous cellulose particles by the method described above, the particles collapsed, and were unable to be used.

Test Example 3

Analysis of S Content

The S content can be determined by the ion chromatography method. Specifically, the content was determined by the method described below. A sample that was dried in vacuum at 60° C. for 16 to 20 hours was ground with a mortar, and further dried at 105° C. for 2 hours. To 0.05 g of the dried sample, 2.5 mL of 2 M hydrochloric acid was added, and the sample was hydrolyzed at 110° C. for 16 hours. After being ice-cooled, 1 mL of supernatant was collected, and neutralized with a 2 M sodium hydroxide aqueous solution, and then diluted in a measuring cylinder to 25 mL total. An analysis was made using IC 7000 Ion Chromatography Analyzer made by Yokogawa Electric Corporation by using ICS-A-23 made by Yokogawa Electric Corporation as a column, and under conditions of an oven temperature of 40° C., and using a 3 mM $Na_2CO_3$ solution as an eluent and 15 mM sulfuric acid as a removing liquid, and a flow rate of 1 mL/min to further determine an $SO_4$ concentration based on a calibration curve prepared from a standard solution to be described later. As a control value, a value obtained upon performing operation in a similar manner without adding the dried sample was taken. A 2 μg/mL liquid of $SO_4$ standard solution (anion mixed standard solution IV, made by Kanto Chemical Industry Co., Ltd.) was used as the standard solution of the present measurement method, and solutions obtained by further diluting the solution stepwise were analyzed by using the ion chromatography analyzer under similar conditions to prepare a calibration curve. A sulfur content ratio was determined by the expression below. In addition, an X sample and an X control represent concentrations ($\times 10^{-4}$%) determined from the calibration curve prepared from the $SO_4$ standard solution.

$$\text{Sulfur content ratio}(\times 10^{-4}\%) = (X \text{ sample} - X \text{ control}) \times 25 \times 2.5 \times 0.3333 / 0.05$$

The sulfur content (by weight) per gram of the dried weight of cellulose particles modified (for example, the sulfated cellulose particles or sulfonated cellulose particles) was calculated based on the sulfur content ratio calculated by the expression described above.

An amount of adsorption of protein was measured by using the sulfated cellulose particles (Example 2A, Example 6A and Comparative Example 2A) prepared as described above, and the cellulose particles (commercial item) in Comparative Example 1.

Each of the cellulose particles was thoroughly washed with a 50 mM Tris-HCl buffer (pH 9.5). Then, 650 mg of protein being a measurement object was arranged, and dissolved into 130 mL of the 50 mM Tris-HCl buffer (pH 9.5) to prepare a protein solution. As the protein, protein described below was used.

(1) Human γ-globulin, derived from serum (made by Wako Pure Chemical Industries, Ltd.)

(2) Lysozyme, derived from egg white (made by Wako Pure Chemical Industries, Ltd.)

Based on 1 mL of cellulose particles, 100 mL of the protein solution prepared as described above was passed therethrough for 2 hours. In order to determine an amount of protein adsorbed onto the cellulose particles, a collected liquid was provided for absorbance measurement with a wavelength of 280 nm to determine an amount of unadsorbed protein. The amount of protein adsorbed onto the cellulose particles was calculated by subtracting the amount of unadsorbed protein existing in the collected liquid from the amount of protein in the protein solution used. The results are shown in Table 6 below.

TABLE 6

| | Amount of adsorption of γ-globulin (mg/mL) | Amount of adsorption of lysozyme (mg/mL) |
|---|---|---|
| Example 2A | 51 | 72 |
| Example 6A | 60 | 87 |
| Comparative Example 1 | 47 | 30 |
| Comparative Example 2A | Unmeasurable | Unmeasurable |

As shown in the results in Table 6, the adsorbent was found to be able to be used as the adsorbent having the amount of adsorption equivalent to or more than the amount of the commercial item by introducing a suitable ligand into the porous cellulose particles related to the embodiment of the invention.

Example 14

Virus Adsorption Test (Influenza Virus)

An influenza virus adsorption test was conducted according to procedures described below with reference to the literature: Microbiol Immunol 2012; 56: 490-495.

(Preparation of Inactivated Virus-Containing Liquid)

An influenza-virus A/duck/Hokkaido/Vac-2/2004 (H7N7) strain was proliferated by using an embryonated egg. A chorioallantoic fluid was collected and centrifuged to collect a supernatant. Then, β-propiolactone was added to the supernatant to be 0.1% in a final concentration to inactivate the virus. The inactivated virus liquid was subjected to filtration by using a cellulose-acetate membrane filter having a pore diameter of 0.45 μm, and the resulting liquid was provided for a test as the inactivated virus-containing liquid.

(Evaluation of Virus Adsorption Ability)

The porous cellulose particles obtained in Examples 2, 6 and 10 were passed through a sieve having an opening of 125 μm and a sieve having an opening of 53 μm to obtain cellulose particles having a particle size of 125 to 53 μm. The cellulose particles obtained were allowed to react with 1 mol equivalent of chlorosulfonic acid at 65° C. to obtain sulfated cellulose particles (hereinafter, taken as Example 2A, Example 6A and Comparative Example 2A). Moreover, the porous cellulose particles obtained in Example 10 were allowed to react with 1 mol equivalent of chlorosulfonic acid at 75° C. to obtain sulfated cellulose particles (hereinafter, taken as Example 10B). When an S content in each of the sulfated cellulose particles (namely, a sulfur content based on 1 g of sulfated cellulose particles) was determined by an ion chromatography method, the content was 14,000 μg/g for Example 2A, 18,000 μg/g for Example 6A, 1,400 μg/g for Example 10A and 4,000 μg/g for Example 10B.

Each of the sulfated cellulose particles obtained as described above was dispersed into water, and deaerated while the resulting mixture was stirred under reduced pressure. Each of a deaerated dispersion liquid was filled into a glass column (φ3×50 mm). The column was connected to a chromatography system and the liquid was equilibrated with a 0.01 M phosphate buffer (pH 7.4). Liquid pass described below was performed at a rate of 0.47 mL/min, and an effluent was collected by 1 mL for each. First, 15 mL of the virus-containing liquid prepared as described above was passed therethrough, and then an unadsorbed portion was washed with a buffer containing 0.01 M phosphate and 0.15 M sodium chloride. Subsequently, liquid pass was performed by increasing a concentration of sodium chloride to 1.5 M at a linear gradient to collect eluent fractions. An HA titer of each of the collected fractions was measured to determine a 10% dynamic adsorption capacitance (DBC). The 10% DBC was taken as viral activity of virus adsorbed up to a fraction before $1/10$ or more of activity strength of the virus-containing liquid used flowed out. In addition, the viral activity (HA titer) was measured as described below.

(Measurement of Viral Activity)

To each round-bottomed 96 well plate, 50 μL of physiological saline was added, and 50 μL of evaluation samples (namely, the eluent fraction obtained as described above and the inactivated virus-containing liquid as a reference) was added to the wells in a first longitudinal line, and thoroughly mixed. Then, 50 μL of the samples diluted 2 times was added to a laterally adjacent well, and thoroughly mixed. A similar operation was repeated to prepare samples diluted 2 times to 4,096 times to a $12^{th}$ well. To each sample, 50 μL of 0.5% chicken red blood cell suspension was added and mixed, and the resulting mixture was allowed to leave for 30 minutes at room temperature. A sample in which no agglutination of blood cells was caused and deposited on the bottom after 30 minutes was taken as presence of the viral activity, and a dilution ratio to one before no activity was recognized was taken as an HA titer per 50 μL of the sample (HAU/50 μL). Moreover, the physiological saline was used as a negative control.

The results are shown in Table 7 below.

TABLE 7

| | S content (μg/g) | 10% DBC HAU/mL-gel |
|---|---|---|
| Example 2A | 14,000 | 29,300 |
| Example 6A | 18,000 | 27,400 |
| Example 10A | 1,400 | 199,000 |
| Example 10B | 4,000 | 112,457 |

From the results, the influenza virus was confirmed to be able to be adsorbed by sulfating the porous cellulose particles related to the embodiment of the invention. However, the results of low dynamic adsorption capacitance of the influenza virus are shown in the sulfated cellulose particles in Example 2 (S content: 1,4000 μg/g) and the sulfated cellulose particles (S content: 18,000 μg/g) in Example 6, in which the S content is high. Thus, an amount of introduction of the sulfate group suitable for adsorbing the virus is presumably present.

For example, the porous cellulose particles are preferably modified with the sulfate group-containing group or the sulfonate group-containing group, and the S content based on the porous cellulose particles modified (namely, the sulfur content based on 1 g of the porous cellulose particles modified) is preferably 800 to 5,000 μg/g, further preferably 800 to 4,000 μg/g, and particularly preferably 800 to 2,000 μg/g. When the S content based on the porous cellulose particles is 700 μg/g or lower, no obtaining of sufficient virus adsorbed amount is demonstrated. Accordingly, a sufficient virus adsorbed amount can be obtained by modifying the porous cellulose particles to be within the range described above for the S content.

Example 15

Virus Adsorption Test (Hepatitis B Virus)

Preparation of Virus-Containing Liquid

A hepatitis B virus HBsAg-XT (Beacle Inc.) was suspended to be 150 μg/mL into a buffer used for equilibration of a chromatography column.

(Evaluation of Virus Adsorption Ability)

The sulfated cellulose particles (Examples 10A and 10B) prepared in Example 14 were used. Each of the sulfated cellulose particles (S content: 1,400 μg/g) in Example 10A and the sulfated cellulose particles (S content: 4,000 μg/g) in Example 10B was dispersed into water, and deaerated while the resulting suspension was stirred under reduced pressure. Each of the dispersion liquid deaerated was filled into a glass column (φ3×50 mm). The column was connected to a chromatography system and equilibrated with a 0.02 M phosphate buffer (pH 7.0) and a 0.05 M citrate buffer (pH 5.0). Then, 2 mL of the virus-containing liquid prepared as described above was passed through the column equilibrated. The liquid pass was performed at a flow rate of 0.25 mL/min, and an effluent was collected by 1 mL for each. After the virus-containing liquid was passed therethrough, an unadsorbed portion was washed by passing the buffer used in the equilibration therethrough. Subsequently, liquid pass was performed by increasing a concentration of sodium chloride aqueous solution at a linear gradient up to 1.5 M to collect eluent fractions (adsorbed portions). Each of the fractions was collected by 1 mL, and a protein concentration in each of the fractions was measured by a BCA assay method to determine a virus collection amount (namely, adsorbed amount). In addition, the BCA assay was performed by applying BSA as a standard according to a manual from Thermo Fisher Scientific K.K.

The results are shown in Table 8 below. In Table 8, "viral load" means an amount of the virus contained in the virus-containing liquid that was passed through the column. "Amount of virus in effluent" means an amount (unadsorbed portion) of the virus contained in the effluent after the virus-containing liquid was passed therethrough and the buffer was passed therethrough, and a ratio (%) thereof means a ratio of the amount of the unadsorbed virus to the amount of the viral load. "Amount of virus in eluent fraction" means an amount of virus (adsorbed portion) contained in the eluent fraction collected by passing the sodium chloride aqueous solution therethrough, and a ratio (%) thereof means a ratio of the amount of the adsorbed virus to the amount of the viral load.

TABLE 8

| | | | Amount of virus | | | | |
|---|---|---|---|---|---|---|---|
| | S content | | Viral load | | Amount of virus in effluent | | Amount of virus in eluent fraction |
| | (μg/g) | pH | (μg) | (%) | (μg) | (%) | (μg) | (%) |
| Example 10A | 1,400 | 5.0 | 283 | 100 | 60.8 | 21.5 | 176 | 62.2 |
| Example 10A | 1,400 | 7.0 | 287 | 100 | 127 | 44.3 | 104 | 36.2 |
| Example 10B | 4,000 | 7.0 | 247 | 100 | 130 | 52.0 | 75 | 30.0 |

Table 8 shows that the sulfated cellulose particles showed the adsorption and collection ability as high as 62.2% to the hepatitis B virus under conditions of pH 5.0. Moreover, the sulfated cellulose particles showed the adsorption and collection ability of 30% or more to the hepatitis B virus even under conditions of pH 7.0 in a neutral region.

In the invention, the sulfated cellulose particles are preferred, in which, for example, the content of cellulose diacetate in the cellulose diacetate solution is 6 to 12% based on the cellulose diacetate solution, cooling is performed to a temperature of 0 to 30° C., the Kav value measured using PEG having a molecular weight of 8,000 is 0.52 or less, and the Kav value measured using PEG having a molecular weight of 12,000 is 45 or less. The protein, the virus or the like has a molecular weight and a size inherent to each, and a relationship between the molecular weight and the size, and magnitude of a pore size (Kav value) of the cellulose particles presumably influences the adsorption amount. The porous cellulose particles (or the cellulose particles modified with a ligand) having the characteristics described above (the production method and the Kav value) are preferred particularly as the media for chromatography for isolating and purify the protein such as the lysozyme, the immunoglobulin and the blood coagulation factor, and the virus such as the influenza virus and the hepatitis B virus, or as the adsorbent.

Although several embodiments of the invention have been described, the embodiments above are presented as examples and are not intended to limit the scope of the invention. These new embodiments can be practiced in other various forms, with various omissions, substitutions, and changes able to be made without deviating from the summary of the invention. These embodiments and variations thereof are included in the scope and summary of the invention and are also included in the invention described in the scope of the claims and any equivalent thereof.

What is claimed is:

1. A method for producing porous cellulose particles, comprising:
   (a) dissolving cellulose diacetate into a solvent to prepare a cellulose diacetate solution, wherein the solvent for the cellulose diacetate solution is ethyl acetate, butyl acetate, or a mixture thereof;
   (b) dispersing the cellulose diacetate solution into a medium immiscible with the cellulose diacetate solution to obtain a dispersed system, wherein a temperature of the medium is 40° C. to 100° C., in the (b), a surfactant is added to the medium, and the surfactant is selected from the group consisting of sorbitan monooleate, polyethylene glycol, alkyl glycoside, and a polyoxyethylene-methylpolysiloxane copolymer;

(c) cooling the dispersed system, wherein the cooling is performed by cooling the dispersed system to a temperature of 40° C. or lower;

(d) adding a poor solvent to the cooled dispersed system to precipitate cellulose diacetate particles, wherein the poor solvent is water, alcohols, glycols or a mixed liquid thereof; and (e) saponifying the cellulose diacetate particles.

2. The method for producing porous cellulose particles according to claim 1, wherein, in the (b), the medium immiscible with the cellulose diacetate solution is water or an organic medium.

3. The method for producing porous cellulose particles according to claim 2, wherein, in the (b), the medium immiscible with the cellulose diacetate solution is an organic medium, and the organic medium is toluene or o-dichlorobenzene.

4. The method for producing porous cellulose particles according to claim 1, wherein, in the (a), the cellulose diacetate has an acetylation degree of 45 to 57%.

5. The method for producing porous cellulose particles according to claim 1, wherein, in the (a), a content of cellulose diacetate in the cellulose diacetate solution is 3 to 20% by weight based on the cellulose diacetate solution.

6. The method for producing porous cellulose particles according to claim 1, wherein, in the (a), the cellulose diacetate is dissolved into the solvent at a temperature of 25° C. to 100° C.

7. The method for producing porous cellulose particles according to claim 6, wherein, in the (a), the cellulose diacetate is dissolved into the solvent at a temperature of 40° C. to 100° C.

8. The method for producing porous cellulose particles according to claim 1, wherein, in the (c), the cooling is performed by cooling the system to a temperature of 0° C. to 40° C.

* * * * *